(12) United States Patent
Signäs

(10) Patent No.: US 10,949,556 B2
(45) Date of Patent: Mar. 16, 2021

(54) METHOD FOR ENCRYPTING DATA AND A METHOD FOR DECRYPTING DATA

(71) Applicant: OSMERUS INVESTMENTS LTD, Paralimni (CY)

(72) Inventor: Alexander Signäs, Paralimni (CY)

(73) Assignee: OSMERUS INVESTMENTS LTD, Paralimni (CY)

( * ) Notice: Subject to any disclaimer, the term of this patent is extended or adjusted under 35 U.S.C. 154(b) by 295 days.

(21) Appl. No.: 16/066,020

(22) PCT Filed: Dec. 22, 2016

(86) PCT No.: PCT/EP2016/082344
§ 371 (c)(1),
(2) Date: Jun. 25, 2018

(87) PCT Pub. No.: WO2017/109052
PCT Pub. Date: Jun. 29, 2017

(65) Prior Publication Data
US 2019/0005258 A1   Jan. 3, 2019

(30) Foreign Application Priority Data
Dec. 23, 2015 (EP) .................... 15202392

(51) Int. Cl.
*G06F 21/62* (2013.01)
*H04L 9/08* (2006.01)
(Continued)

(52) U.S. Cl.
CPC .......... *G06F 21/6209* (2013.01); *H04L 9/085* (2013.01); *H04L 9/088* (2013.01);
(Continued)

(58) Field of Classification Search
CPC ..... G06F 21/6209; G06F 21/335; H04L 9/14; H04L 9/088; H04L 9/0819; H04L 9/3226; H04L 63/045; H04L 9/085
See application file for complete search history.

(56) References Cited

U.S. PATENT DOCUMENTS 7,069,435 B2 * 6/2006 Sandhu ................. H04L 9/0825
380/279
7,111,173 B1 9/2006 Scheidt
(Continued)

OTHER PUBLICATIONS

"Bian et al., A Role-based Secure Group Communication Framework, Jun. 2008, IEEE, pp. 1-6" (Year: 2008).*
(Continued)

*Primary Examiner* — Saleh Najjar
*Assistant Examiner* — Nhan Huu Nguyen
(74) *Attorney, Agent, or Firm* — Moser Taboada

(57) ABSTRACT

The invention concerns a method for decrypting data sent by a first user having at least a first role in a first entity, the first entity comprising at least the first user and a first instance, to a second user having at least a second role in a second entity, the second entity comprising at least the second user and a second instance, the data being encrypted using a symmetric encryption key, the symmetric encryption key being encrypted using a public key of an asymmetric key pair comprising a private key and a public key, wherein the asymmetric key pair is associated with the second role of the second user, and the encrypted data is associated with a transmission ID, the method furthermore involving the use of an element for electronic or digital identification and authentication identifying the second user in his second role and being unique to the second role. The invention also concerns a corresponding method for encrypting data.

10 Claims, 10 Drawing Sheets

(51) Int. Cl.
*H04L 9/14* (2006.01)
*H04L 9/32* (2006.01)
*H04L 29/06* (2006.01)
*G06F 21/33* (2013.01)

(52) U.S. Cl.
CPC .............. *H04L 9/0819* (2013.01); *H04L 9/14* (2013.01); *H04L 9/3226* (2013.01); *H04L 63/045* (2013.01); *G06F 21/335* (2013.01)

(56) References Cited

U.S. PATENT DOCUMENTS

| | | | | |
|---|---|---|---|---|
| 8,316,237 | B1* | 11/2012 | Felsher | H04L 9/0825 380/282 |
| 8,769,260 | B1* | 7/2014 | Kwan | H04L 9/0825 713/153 |
| 9,894,067 | B1* | 2/2018 | Mandadi | H04L 63/0876 |
| 2003/0182559 | A1* | 9/2003 | Curry | H04L 9/0825 713/189 |
| 2004/0098589 | A1* | 5/2004 | Appenzeller | H04L 9/3073 713/170 |
| 2004/0179684 | A1* | 9/2004 | Appenzeller | H04L 9/3073 380/44 |
| 2006/0248336 | A1* | 11/2006 | Bruns | H04L 9/3013 713/171 |
| 2007/0067618 | A1* | 3/2007 | Sandhu | H04L 9/302 713/155 |
| 2007/0230706 | A1* | 10/2007 | Youn | G06Q 20/3829 380/277 |
| 2009/0060201 | A1* | 3/2009 | Rhodes | H04L 63/10 380/279 |
| 2009/0271616 | A1* | 10/2009 | Hofstadter | H04L 63/08 713/153 |
| 2010/0017593 | A1* | 1/2010 | Putz | H04L 9/3073 713/150 |
| 2011/0116628 | A1* | 5/2011 | Wack | H04L 9/0869 380/44 |
| 2011/0213957 | A1* | 9/2011 | Tsai | H04L 9/3234 713/153 |
| 2011/0302405 | A1* | 12/2011 | Marlow | H04W 12/0013 713/150 |
| 2013/0191629 | A1* | 7/2013 | Treinen | H04L 9/08 713/153 |
| 2013/0262858 | A1* | 10/2013 | Neuman | H04L 63/083 713/155 |
| 2015/0088756 | A1* | 3/2015 | Makhotin | G06Q 20/401 705/71 |
| 2015/0121063 | A1* | 4/2015 | Maller | H04L 63/045 713/153 |
| 2015/0195261 | A1* | 7/2015 | Gehrmann | H04L 9/0833 726/7 |
| 2015/0310188 | A1* | 10/2015 | Ford | H04L 63/0428 726/28 |
| 2016/0259936 | A1* | 9/2016 | Mukherjee | G06F 21/41 |
| 2016/0373263 | A1* | 12/2016 | Zaidi | H04L 9/3265 |

OTHER PUBLICATIONS

"Bokefode et al., Developing Secure Cloud Storage System by Applying AES and RSA Cryptography Algorithms with Role based Access Control Model, May 2015, International Journal of Computer Applications, pp. 1-7" (Year: 2015).*

Adamouski F. J. Ed, "Encryption Technology Other Than PKI", IEEE Proceedings 14th IEEE Symposium on Computer Arithmetic. Los Alamitos, CA Apr. 14, 1999, pp. 108-116.

International Preliminary Examining Report dated Feb. 1, 2018 for Application No. PCT/EP2016/082344.

* cited by examiner

METHOD FOR ENCRYPTING DATA AND A METHOD FOR DECRYPTING DATA

TECHNICAL FIELD

The present invention relates to a method for decrypting data by combining asymmetric and symmetric encryption in a decentralised system. The present invention furthermore relates to a corresponding method for encrypting data.

List of Terms

As used herein, an asymmetric key pair, AKP, is intended to encompass any suitable type of key pair comprising a private key and a public key used for encryption. An asymmetric key pair AKP may be associated with users, roles, devices and/or groups.

A symmetric encryption key, SEK, as used herein comprises one or more partial symmetric keys, PSEK, which in case of more symmetric keys PSEK may be combined, for example by means of a logica or bit operation, to form the symmetric encryption key SEK. All symmetric encryption keys, SEK, used within a given transmission are unique for that specific transmission.

As used herein, an element for electronic or digital identification and authentification, ID, is an element that is electronically transmittable and suitable for identification and authentification. Non-limiting examples are a key pair comprising a private key and a public key, such as an asymmetric key pair as described above. Non-limiting examples of usage of an element for electronic or digital identification and authentification ID are for identification and authentication of a user, a role or a device.

As used herein, an entity, E, is intended to encompass any entity or organization comprising any number of associated users U with roles R and any number of associated devices D. Typically, an entity E is a private or public company or organization, which may be of any feasible size.

Likewise, as used herein, a witness entity, WE, is intended to encompass any entity or organization comprising any number of associated users U with roles R and any number of associated devices D, albeit with a higher level of trust than just any entity. Non-limiting examples of a witness entity WE is a law office, a patent attorney office, an authorized accountant's office or the like.

As used herein, an instance S is intended to mean an instance of a service connected to or associated with an entity E, the service being located on a local server within the entity E or being supplied by a service provider. Non-limiting examples of an instance S is thus an instance of a local server, or an instance of an external server or a cloud service supplied by an external provider.

As used herein, an electronic device, D, is intended to encompass any electronic device usable within an organization or entity E. Non-limiting examples are stationary computers, lap-top computers, tablets and smart phones. A device D and its user U is identified and authenticated by means of an element for electronic or digital identification and authentification ID.

As used herein, a user, U, is intended to encompass any person associated with an entity E. Such a user U may have one or more roles R in the organization or entity E, he may be associated with one or more groups G and he may have access to use one or more devices D. A user and the user's current device is identified and authenticated by means of an element for electronic or digital identification and authentification ID. A user furthermore has one or more asymmetric key pairs AKP, which are associated with the user.

As used herein, a role, R, is intended to encompass any role that a person or user U may have in an organization or entity E. Non-limiting examples are the role of any one of a CEO, CFO, CTO over mid-level manager to general employees and customers. An ID is used to identify and authenticate a user who has access to a given role R as well as the user's device associated with the given role R. A role R furthermore has one or more asymmetric key pairs AKP, which are associated with the role.

As used herein, a group, G, is intended to encompass any group of users U or roles R set up within an organization or entity E. A group G furthermore has one or more asymmetric key pairs AKP, which are associated with the group.

As used herein, a network, N, is intended to encompass any network through which users and/or entities may communicate electronically with one another, including but not limited to LANs, WANs and the Internet.

As used herein, an identification token, IDT, is intended to encompass any identification token that is electronically transmittable and suitable for verifying to a third party user or entity that a user U in a given role R is who he claims to be. An identification token IDT is typically, but not necessarily limited to, a random sequence of characters being unique, long and complex enough to enable such verification.

As used herein, an input unit, C, is intended to encompass any suitable device by means of which an instance S of an entity E may be managed directly by logging on and manually changing information related to the entity E.

As used herein, an application, A, is intended to encompass any application usable by a user U or an organization or entity E. A non-limiting example is that a user U having a role R in the entity E may gain access to the application A and/or to information within the application A in virtue of having the role R. An application A may be owned by the entity E or by another entity. Non-limiting examples are applications giving access to one or more databases, such as e.g. a database comprising data regarding a given group of persons.

As used herein data, M, is intended to encompass any type of data that it may be desired to encrypt and send to one or more receiving users U, roles R or groups G. Such data M may in principle be any digital data, non limiting examples of such data M being a message and a document.

As used herein, a transmission ID, TID, is intended to encompass any transmission ID that may be transmitted in connection with the encrypted data M and is suitable for allowing a third party user or entity to identify the specific transmission of the encrypted data M with which it is transmitted. A transmission ID is typically a, possibly random, sequence of characters being unique, long and complex enough to enable such identification.

Furthermore, wherever used a suffixed integer denotes the number of the feature to which the integer is suffixed. For example, U1 denotes a first user and E2 a second entity.

Finally, wherever used a feature in parentheses suffixed to a given feature denotes that the given feature is unique for, associated to or has the feature in the parentheses. For example, ID1(D1) denotes a first element for electronic or digital identification and authentification ID1 which is unique for or associated to a first electronic device D1, while U1(R1, D1) denotes a first user U1 having both a first role R1 and a first electronic device D1.

PRIOR ART

Humans in modern society switch between roles all the time. Changing roles comes natural for us in the physical world as we go to work or act either as private persons or representatives of different legal entities. In the digital world all these different roles are usually merged into one role and then every company or service desires to own and/or control this one role that represents a person. A further consequence is that in this way a person's identity will over time be split up into several autonomous parts owned by separate entities. This also makes business, company to company, communication impractical since one entity owns and controls all the data and access to that data. Traditional encryption is thus based on two things, namely: 1) All users in a system is known and has one unique encryption key, and 2) All recipients of the encrypted data are known at the time of encryption. This implies that all public keys need to be available at the time of encryption and that one cannot add new recipients of the encrypted data after the encryption is done.

Humans in modern society also switch between electronic devices all the time. Changing electronic devices also comes natural for us in the physical world as we switch between e.g. computers, tablets and mobile telephones. Therefore, it is desired to enable users to act in a controlled manner across multiple electronic devices. Furthermore, it is desired to provide tools enabling to control electronic devices and what access to systems and encrypted content each electronic device will have.

US 2011/0116628 A1 describes a method for creating cryptographic keys which in turn can be used for encrypting data to secure a data object, the data object including a tagged element. The method includes cryptographically securing a data object including one or more respectively tagged data elements including selecting a tagged data element from among a plurality of tagged data elements, based on an associated data tag. A plurality of cryptographic key splits is generated from seed data. The cryptographic key splits are bound together to produce a first cryptographic key. A second cryptographic key is generated based on security requirements of the data object. The tagged data element is encrypted using the first cryptographic key. The data object is encrypted using the second cryptographic key. At least one of the cryptographic key splits is based on the associated data tag. US 2011/0116628 A1 is not concerned with any details regarding the process of encrypting the data apart from that the keys created are used.

U.S. Pat. No. 7,111,173 B1 describes a method of encrypting an object in a centralised system with central key management (CKM) and in which a credential manager is responsible for holding and distributing all user related information. The method includes generating a cryptographic key, using the cryptographic key to initialize a cryptographic algorithm, and applying the algorithm to the object, thereby forming an encrypted object. The key is generated by combining key splits derived from different sources. One of the key splits is a biometric value derived from and corresponding to a particular person. U.S. Pat. No. 7,111,173 B1 is not concerned with decryption or encryption in a decentralized system, nor with roles of users in the system.

The article "Encryption Technology Other than PK1" by Frank J. Adamouski, LTC, US Army Retried, published in IEEE Comp. Soc. Press, USA, 14 Apr. 1999, describes features of a cryptographic key management system called constructive key management (CKM) developed by TECSEC Incorporated for the US Navy. The CKM system is a highly centralized system in which a domain authority has absolute authority over setting and controlling elements of the system, including policies, cryptographic algorithms, links between domains and distribution of keying material. Hence, the above-mentioned article is not concerned with decryption or encryption in a decentralized system, nor with roles of users in the system.

U.S. Pat. No. 9,031,876 B2 describes a method for managing and distributing encryption keys for more efficient handling of documents, which are to be sent to and accessed by several users. The encryption keys are managed by a system administrator who, while logged into a system administrator account, creates a group private key, a group public key, and a group symmetric key, a member private key, and a member public key. The key administrator also encrypts the group private key with the group symmetric key, and encrypts said group symmetric key with the member public key. A publisher encrypts a document using the group public key. The publisher distributes the resulting encrypted group document so that it is accessible via a member account but not through the key administrator account. Hence, in this system all key management is performed centrally in a closed hierarchical system. Also, such a system is designed to work within one and the same entity.

However, the above described prior art systems all have the drawback, that if the central key administrator account is taken down or otherwise malfunctions, the sending user or publisher cannot get access to the keys needed for the encryption and/or the receiving user cannot gain access to the keys necessary for decrypting the encrypted document, and thus cannot gain access to the encrypted document. The use of a central key administrator account furthermore results in a complex and time consuming encryption and decryption process.

Likewise, in the known systems, when a user changes roles or abandons a role or entity, such changes may result in that new persons taking up that role can no longer access encrypted data which may nevertheless be important or even crucial to act in the role.

Furthermore, as such systems are designed to work within one and the same entity, and as this one entity owns all IPR, power and traceability, communication with another entity cannot be carried out correctly.

Therefore, there is a desire for providing a method for encrypting and decrypting data by means of combining asymmetric and symmetric, which method makes encryption more easy to use in a professional manner, and enables each user to gain access to the keys necessary for encrypting the data or decrypting the encrypted data, as the case may be, without depending on a central key administration, and which thus is simpler and less time consuming to use for each individual user.

There is furthermore a desire for providing such a method which furthermore enables the first entity to see and control what receiving user in which role is attempting to access the encrypted data and therefore enables tracking or logging which user(s) have accessed the encrypted data.

There is furthermore a desire for providing such a method which still has a very high degree of security such as to avoid that unauthorized users may gain access to the encrypted data.

Also, there is a desire for providing such a method with which communication between two separate entities can be carried out correctly where, ownership and access to keys is acceptable for both parties, intellectual property and other laws, regulations or compliance rules are fulfilled for both parties.

SHORT DESCRIPTION OF THE INVENTION

It is an object of the present invention to overcome these problems, and to provide a method for encrypting and decrypting data by means of combining asymmetric and symmetric encryption, which method enables each user to gain access to the keys necessary for encrypting the data or decrypting the encrypted data, as the case may be, without depending on a central key administration, and which method thus is simpler and less time consuming to use for each individual user.

A further object of the invention is to provide such a method which furthermore enables the first entity to see and control what receiving user in which role is attempting to access the encrypted data and therefore enables tracking or logging which user(s) have accessed the encrypted data.

A further object of the invention is to provide such a method which furthermore enables users to act in a controlled manner across multiple electronic devices and enables to control electronic devices and what access to systems and encrypted content each electronic device will have.

In other words, an object of the invention is to provide an improved distribution of encryption keys and an improved and simplified manner of addressing a user and/or an electronic device without depending on a central key administrator, i.e. in a decentralized system.

A further object of the invention is to provide such a method which furthermore has a very high degree of security such as to avoid that unauthorized users may gain access to the encrypted data.

Also, an object of the invention is to provide such a method with which communication between two separate entities can be carried out correctly where, ownership and access to keys is acceptable for both parties, and intellectual property and other laws, regulations or compliance rules are fulfilled for both parties.

According to a first aspect of the invention, these and other objects are achieved by means of a method for decrypting data sent by a first user having at least a first role in a first entity, the first entity comprising at least the first user and a first instance, to a second user having at least a second role in a second entity, the second entity comprising at least the second user and a second instance, the data being encrypted using a symmetric encryption key comprising one or more partial symmetric encryption keys, the partial symmetric encryption keys of the symmetric encryption key being encrypted using a public key of an asymmetric key pair comprising a private key and a public key, wherein the asymmetric key pair is associated with the second role of the second user, and the encrypted data is associated with a transmission ID, the method comprising the following steps:

a) the second user receives the encrypted data in his second role, b) the second user provides an element of identification and authentication identifying the second user in its second role and being unique to the user in its second role and the asymmetric key pair associated with this role or user, c) the second user sends a first request to the second instance requesting access to the encrypted transmission, the first request comprising the transmission ID and the element for electronic or digital identification and authentification identifying the second user in its second role and being unique to the user in its second role, and if the transmission ID is a new transmission ID for the second instance, an information request is sent by the second instance to the first instance for information about the transmission, in response to the first request the second instance sends an identification token to the second user, the identification token will be used for identifying and authenticating the user and its role in the second entity, d) the second user sends a second request to the first instance for access to the partial symmetric key held by the first instance, the second request comprising the identification token, information identifying the second role of the second user and the transmission ID, e) the first instance in reaction to the second request sends a third request to the second instance to obtain authentication and verification of the identity of the second user, the third request comprising the identification token and the information identifying the second role of the second user, f) if the second instance recognizes the identification token and the information identifying the second role of the second user, the second instance responds to the third request by transmitting the name and other relevant data regarding the second user to the first instance, g) the first instance in reaction to the authentication of the role and name and other relevant data regarding the second user received in step h) transmits the held partial symmetric encryption key to the second user, after which the second user can decrypt and where appropriate combine the partial symmetric encryption keys to create the symmetric encryption key that is then used to decrypt the encrypted data.

By providing a public encryption key being associated with the second role of the second user, a method is provided with which it becomes possible to address the encrypted data to a specific role without specifying a specific user. Thus, users can be made the recipients of encrypted information based on their roles, and the actual user behind the role person does not have to be specified. The person behind a role or function within an entity can thus be added, removed or replaced by a new person who can access the data created or received by its predecessor.

Thereby a method is obtained with which each individual user is enabled to gain access to the keys necessary for encrypting the data or decrypting the encrypted data, as the case may be, based on their role and thus without depending on a central key administration. Simultaneously the security level is still very high and thus not compromised. Furthermore, such a method enables carrying out communication between two separate entities in a correct and simple manner by combining asymmetric and symmetric encryption in a distributed system such as to allow the different entities to control for example users, keys and access to data in a correct manner, non-limiting examples are according to applicable intellectual property laws, regulations or compliance rules. Furthermore, a method is provided which which also enables users to act in a controlled manner across multiple electronic devices and enables to control electronic devices and what access to systems and encrypted content each electronic device will have.

By furthermore providing the step of the second user sending a first request to the second instance for a partial or complete symmetric encryption key, the first request comprising the transmission ID and an element for electronic or digital identification and authentification identifying the second user in his second role and being unique to the second role, and in particular in virtue of the method involving the use of an element for electronic or digital identification and authentification being unique to a user in a given role, it becomes necessary for the second user receiving the encrypted data to identify himself to the first entity of the first user on a personal level in order to obtain the symmetric encryption key. This in turn makes it possible for the first user and entity to see and control what user in which role is attempting to access which encryption keys and/or what encrypted data.

Furthermore, a method is provided in which it is possible to remove access to encrypted content after a person has been denied access to a role. Even if the user still has the element for electronic or digital identification and authentication, the asymmetric key pair AKP associated with the role and the encrypted data the user will not be able to access any decrypted data if the access to the role has been disabled.

Furthermore, a method of revoking access to a symmetric key in the first instance is provided. This makes it possible for user or entity one to deny user two the right to open the transmission even if user 2 has access to the asymmetric key pair AKP and the encrypted data.

Thereby a method is obtained with which a high degree of traceability and security is made possible.

Furthermore, the request exchange carried out in steps c), d) and e) and the verification carried out in virtue of steps f) and g), respectively, makes it possible for also both the first instance and the second instance of the first entity to see and control what user in which role is attempting to access the encrypted data, and consequently provides for a method with which the degree of traceability and thus security is made even higher, while simultaneously still enabling each individual user to gain access to the keys necessary for encrypting the data or decrypting the encrypted data, as the case may be, based on his role and thus without depending on a central key administration.

Thus, an improved distribution of encryption keys and an improved and simplified manner of addressing a user and/or an electronic device without depending on a central key administrator, i.e. in a decentralized system, is hereby provided for. The user desiring to access received data is made independent of a centralized managing system, and thus of other legal persons. The same applies for the user sending the data, since the invention provides for that the key to access the content will be stored in the sending user's node until the receiving user checks the key out.

In an embodiment the symmetric encryption key used for encrypting the data further comprises at least one further partial symmetric encryption key, the at least one further partial symmetric encryption key being stored in at least one witness entity, the at least one witness entity comprising a third instance, and the method further comprises performing the following steps after step a):

h) the second user sends a sixth request to the third instance for the at least one further partial symmetric encryption key, the sixth request comprising the identification token, information identifying the second role of the second user and the transmission ID, i) the third instance in reaction to the sixth request sends a seventh request to the second instance to obtain identification and authentication of the identity of the second user, the seventh request comprising the identification token and the information identifying the second role of the second user, j) if the second instance recognizes the identification token and the information identifying the second role of the second user, the second instance responds to the seventh request by transmitting the name and other relevant data regarding the second user to the third instance, k) the third instance in reaction to the name and other relevant data regarding the second user received in step m) transmits the at least one further partial symmetric encryption key to the second user, after which the second user may decrypt the further partial symmetric encryption key and the one or more partial symmetric encryption keys using the asymmetric key pair associated with the role, combine the further partial symmetric encryption key and the one or more partial symmetric encryption keys to a combined symmetrical encryption key and then decrypt the encrypted data using the combined symmetric encryption key.

Thereby, a method is provided with which a further layer of both security and traceability is added.

When the symmetric encryption key comprises more than one partial symmetric encryption key, the at least one partial symmetric encryption key may be received by the second user with the encrypted data.

In an embodiment step h) comprises the step that the partial symmetric encryption keys are transmitted to the second instance to be stored In an alternative embodiment step h) comprises the following steps:

the first instance in reaction to the confirmation received in step g) transmits the at least one partial symmetric encryption key to the second instance, and the second instance transmits the at least one partial symmetric encryption key to the second user.

Thereby, the traceability is increased even further, as the second instance may also gain information on whether the first instance has sent the symmetric encryption key to the second user.

In an embodiment the method further comprises the step of the second instance storing the at least one partial symmetric encryption key.

This measure makes the second entity legally and technically independent of the first entity or witness entities.

This measure also enables the second user or for that matter other users to retrieve all the partial symmetric encryption keys, from the second instance, needed for decryption at a later time independently of the first entity and instance and thus irrespective of the first instance still existing or whether the first user is still actually associated with the first entity and/or first role. Thereby, the need for a central key administration is eliminated totally and the method provided is therefore both simpler and less time consuming.

In an embodiment the method further comprises the step that when the second user requests access to open the data received in step a) for the second time, the second instance replies with all partial symmetric encryption keys.

Thereby, the method is simplified and made less time consuming and legally correct in that the second user will receive all keys from the second entity.

In an embodiment the method further comprises logging in at least one of the first instance, the second instance and the third instance data indicative of user activity related to any one or more of the first instance, the second instance and the third instance, particularly data indicative of user activity related to attempts to obtain a partial symmetric encryption key from at least one of the first instance, the second instance and the third instance. The thus logged data may be stored in a database or a memory unit.

Thereby a further layer of traceability is added, in that it is enabled to also trace attempts at obtaining encryption key(s) made previously in time by using the log. This in turn may for instance enable discovering by means of such a log attempts made by unauthorized users at gaining access to encryption keys.

In an embodiment the second user furthermore has at least a second electronic device associated with the second role, and at least one of the asymmetric key pairs and the element for electronic or digital identification and authentification is associated to the second electronic device.

Thereby, a method is provided with which a further layer of both security and traceability is added, in that it also becomes possible to see and trace and even log which device is used to create the transmission and/or which device is used in an attempt to gain access to the encrypted data.

In an embodiment the first user furthermore has at least a first electronic device associated with the user in the first role and the first instance further comprises an input device, and, in case the first electronic device is missing, the method further comprises the step of the user disabling the first electronic device by means of said input device.

In a further embodiment the second instance further comprises an input device, and wherein, in case the second electronic device is missing, the method further comprises the step of the user disabling the second electronic device by means of said input device.

Thereby, a method is provided with which a device which has gone missing or been stolen may be rendered unusable for gaining access to encrypted data. Thus, a further layer of security is added.

In an embodiment the at least one symmetric encryption key comprises several partial symmetric keys provided separately and joined to form the symmetric encryption key.

The witness encryption key may be one of the partial symmetric keys provided separately and joined to form the symmetric encryption key.

Thereby, a method is provided with which further layers of security are added in that the encryption may be made increasingly complex with the number of keys added.

According to a second aspect of the invention, the above and other objects are achieved by means of a method for encrypting data to be sent by a first user having at least a first role in a first entity, the first entity comprising at least the first user and a first instance, to a second user having at least a second role in a second entity, the second entity comprising at least the second user and a second instance, the method comprising the following steps:

providing data, obtaining a transmission ID, obtaining at least one public encryption key from the second entity, the at least one public encryption key being associated with the second role of the second user, providing one or more partial symmetric encryption keys, obtaining at least one symmetric encryption key by combining the one or more partial symmetric encryption keys to create the at least one symmetric encryption key, and encrypting the data using the at least one symmetric encryption key, and encrypting the partial symmetric encryption keys of the at least one symmetric key with the at least one public encryption key.

In an embodiment the encryption method further comprises the steps of:

providing at least one further partial symmetric encryption key, encrypting the data using the at least one symmetric encryption key, the at least one symmetric encryption key further comprising the at least one further partial symmetric encryption key, and transmitting the at least one further partial symmetric encryption key to at least one witness entity for safe storage.

In an embodiment the second user furthermore has at least one second electronic device associated with the second user in the second role, and wherein and at least one of the asymmetric key pairs and an element for electronic or digital identification and authentification identifying the second user in its second role and being unique to the user in its second role is associated with the electronic device.

In an embodiment the at least one symmetric encryption key comprises several partial symmetric encryption keys provided separately and joined to form one symmetric encryption key.

The further partial symmetric encryption key may be one of the symmetric keys provided separately and joined to form the symmetric encryption key.

According to a third aspect of the invention, the above and other objects are achieved by means of a method for decrypting data sent by a first user having at least a first role in a first entity, the first entity comprising at least the first user and a first instance, to a second user having at least a second role in the first entity, the data being encrypted using an symmetric encryption key comprising one or more partial symmetric encryption keys, the symmetric encryption key being encrypted using a public key of an asymmetric key pair comprising a public encryption key and a private encryption key, wherein the asymmetric key pair is associated with the second role of the second user, and the encrypted data is associated with a transmission ID, the method comprising the following steps:

a) the second user receives the encrypted data in his second role, b) the second user provides an element of identification and authentication identifying the second user in its second role and being unique to the user in its second role and the asymmetric key pair associated with this role or user, c) the second user sends a first request to the first instance requesting access to the encrypted transmission, the first request comprising the transmission ID and the element for electronic or digital identification and authentification identifying the second user in its second role and being unique to the user in its second role, d) if the first instance recognizes the information identifying the second role of the second user, the first instance transmits the held partial symmetric encryption key to the second user, after which the second user can decrypt and where appropriate combine the partial symmetric encryption keys to create the symmetric encryption key that is then used to decrypt the encrypted data.

According to a fourth aspect of the invention, the above and other objects are achieved by means of a method for encrypting data to be sent by a first user having at least a first role in a first entity, the first entity comprising at least the first user and a first instance, to a second user having at least a second role in the first entity, the method comprising the following steps:

providing data obtaining a transmission ID, obtaining at least one public encryption key from the first entity, the at least one public encryption key being associated with the second role of the second user, providing one or more partial symmetric encryption key obtaining at least one symmetric encryption key by combining the one or more partial symmetric encryption keys to create the at least one symmetric encryption key, and encrypting the data using the at least one symmetric encryption key and encrypting the at least one symmetric key with the at least one public encryption key.

It is noted that the invention relates to all possible combinations of features recited in the claims.

SHORT DESCRIPTION OF THE DRAWING

FIG. 1 schematically shows a first entity according to the invention and comprising an instance and a plurality of users, the plurality of users having a plurality of roles and devices.

FIG. 2 schematically shows a second entity according to the invention and comprising an instance and a plurality of users, the plurality of users having a plurality of roles and devices.

FIG. 3 schematically shows an example of communicating data from the first entity of FIG. 1 to the second entity of FIG. 2.

FIG. 4 schematically shows an example of communicating data from a first user to a second user, both being users of the first entity of FIG. 1.

FIG. 5 schematically illustrates how the key pairs are distributed over different users. The two users U1 and U2 are sharing role R2. The encryption or asymmetric key pair AKP5 is the same even for both users U1 and U2. User U2 is also using his element for electronic or digital identification and authentification ID4 on both role R2 and role R3, and thereby reduces the amount of pin codes necessary.

FIG. 6 schematically illustrates how the keys are distributed over different devices. On electronic device D1 the user U1 is able to use role R1 and role R2. On electronic device D2 the user U1 will be able to use role R1 and role R3. On electronic device D3 the user U1 will only have access to role R1. The encryption or asymmetric key pairs AKP are the same key pairs on the different devices D1-D3. The only key pairs that are unique are the ID key pair.

FIG. 7 schematically shows a witness entity according to the invention and comprising an instance and a plurality of users, the plurality of users having a plurality of roles, devices, elements for electronic or digital identification and authentification and private and public encryption keys.

It is noted that like reference numerals refer to like elements or features throughout.

DETAILED DESCRIPTION OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
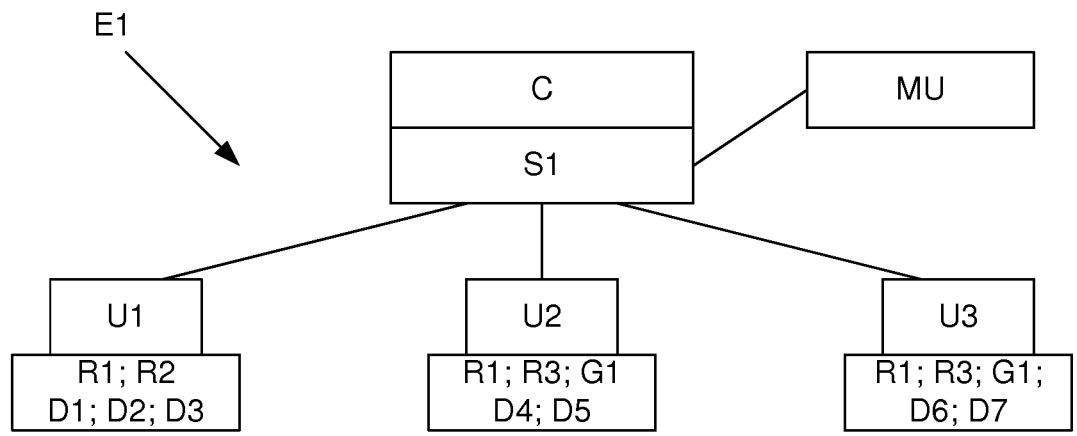

FIG. 1 schematically shows a first entity E1 according to the invention and comprising a first instance S1 and a plurality of users U1, U2 and U3. The respective users U1, U2 and U3 each have a plurality of roles R and a plurality of devices D. Irrespective of the embodiment and entity E, the devices D may comprise one or more applications A in the form of programs that can be run on the device D.

The first user U1 has a first role R1 and a second role R2 within the first entity E1. The first user U1 furthermore has a first, second and third electronic device D1, D2 and D3, which may each be associated with one or both of the first and second role R1 and R2 in a manner to be described further below.

Likewise, the second user U2 has a first role R1 and a third role R3 within the first entity E1. In other words, as both the first user U1 and the second user U2 has the first role R1, several users may have the same role within an entity. The second user U2 furthermore has a fourth and a fifth electronic device D4 and D5, which may each be associated with one or both of the first and third role R1 and R3 in a manner to be described further below. The second user U2 is furthermore member of a first group C1.

Likewise, the third user U3 has a first role R1 and a third role R3 within the first entity E1. The third user U3 furthermore has a sixth and a seventh electronic device D6 and D7, which may each be associated with one or both of the first and third role R1 and R3 in a manner to be described further below. The third user U3 is furthermore member of the first group C1, such that the second user U2 and the third user U3 form the first group C1, for example in virtue of their common third role R3.

The first instance S1 comprises an input unit C for direct management by logging on and manually changing information related to the first entity E1. Non-limiting examples of input units C are a suitable web-page, a keyboard, a touch screen and a mouse. The first instance S1 furthermore comprises a database or a memory unit MU for storing information such as keys or logging data.

Figure 2:
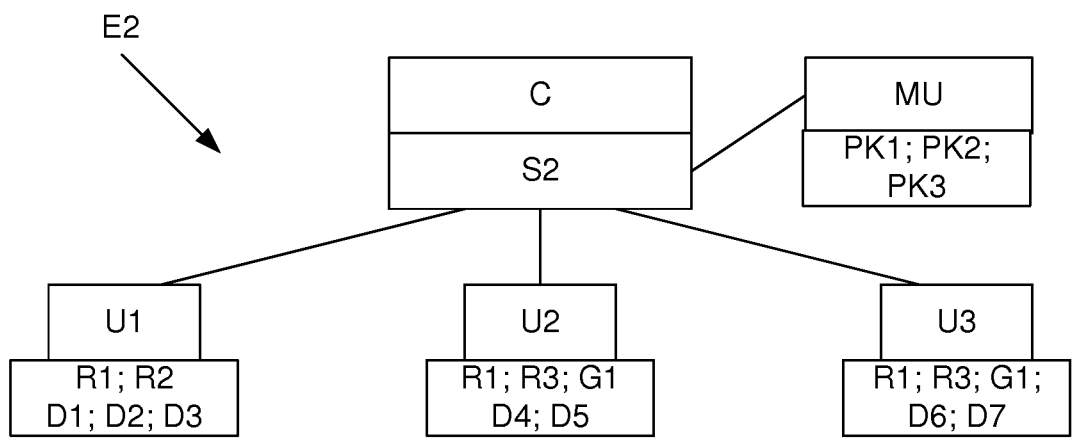

FIG. 2 schematically shows a second entity E2 according to the invention and comprising a second instance S2 and a plurality of users U1, U2 and U3. The second entity E2 is similar to the first entity E1 described above and the respective users U1, U2 and U3 thus in a similar manner each have a plurality of roles R and a plurality of devices D.

The second instance S1 comprises an input unit C for direct management by logging on and manually changing information related to the second entity E2. The first instance S1 furthermore comprises a memory unit MU for storing information, for example in the form of public encryption keys, PK1, PK2 and PK3.

Figure 3:
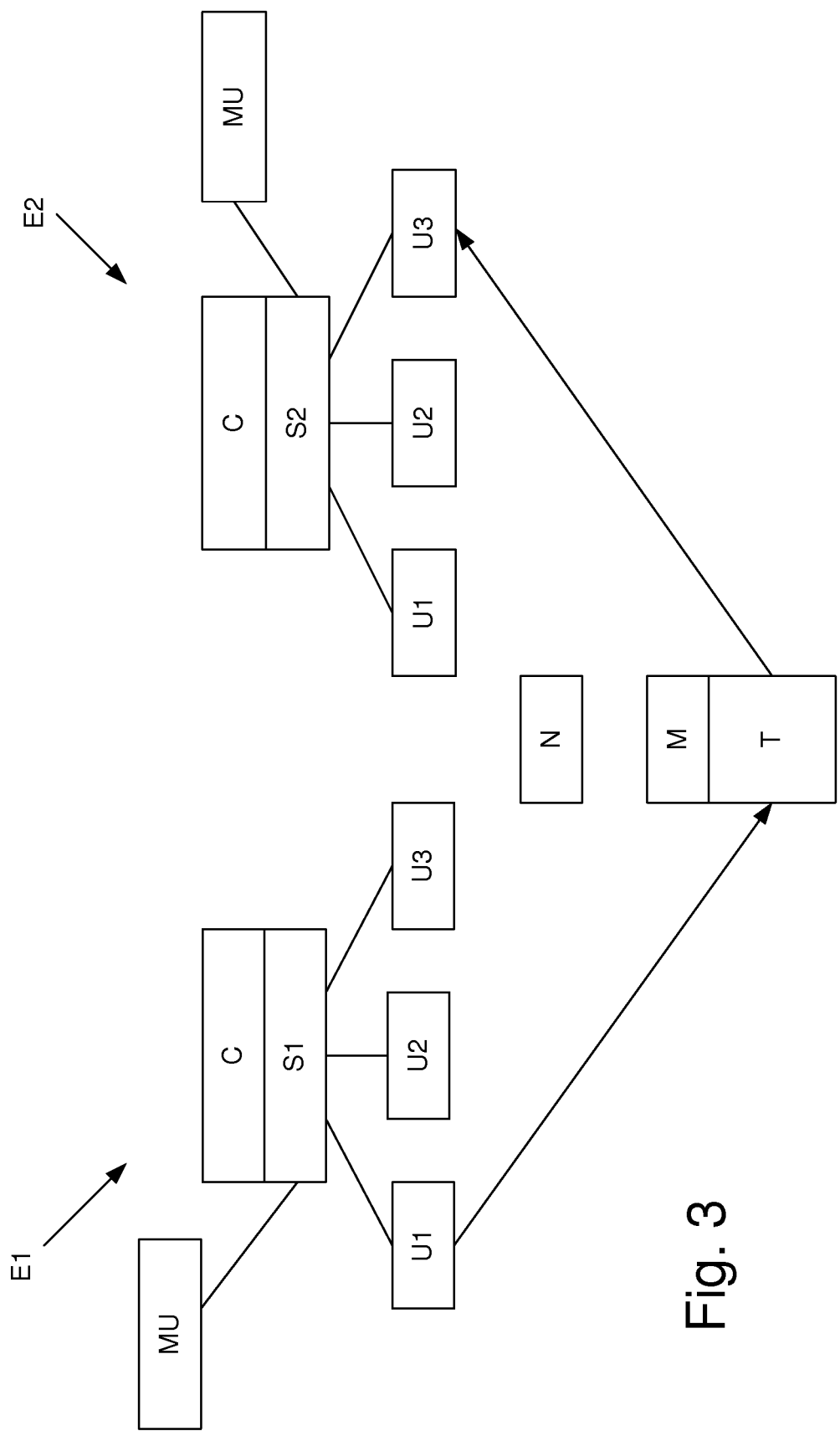

FIG. 3 schematically shows an example of communicating data M from the first user U1 of the first entity E1 to the third user U3 of the second entity E2. As illustrated, the first user U1 on his own, i.e. without going through the first instance S1, sends encrypted data M in the form of a message comprising a text string T and a public encryption key PK directly to the third user U3 of the second entity E2, and thus without going through the second instance S2. The encrypted data is transmitted over a network N, which may in this case for example be a WAN or the internet.

Figure 4:
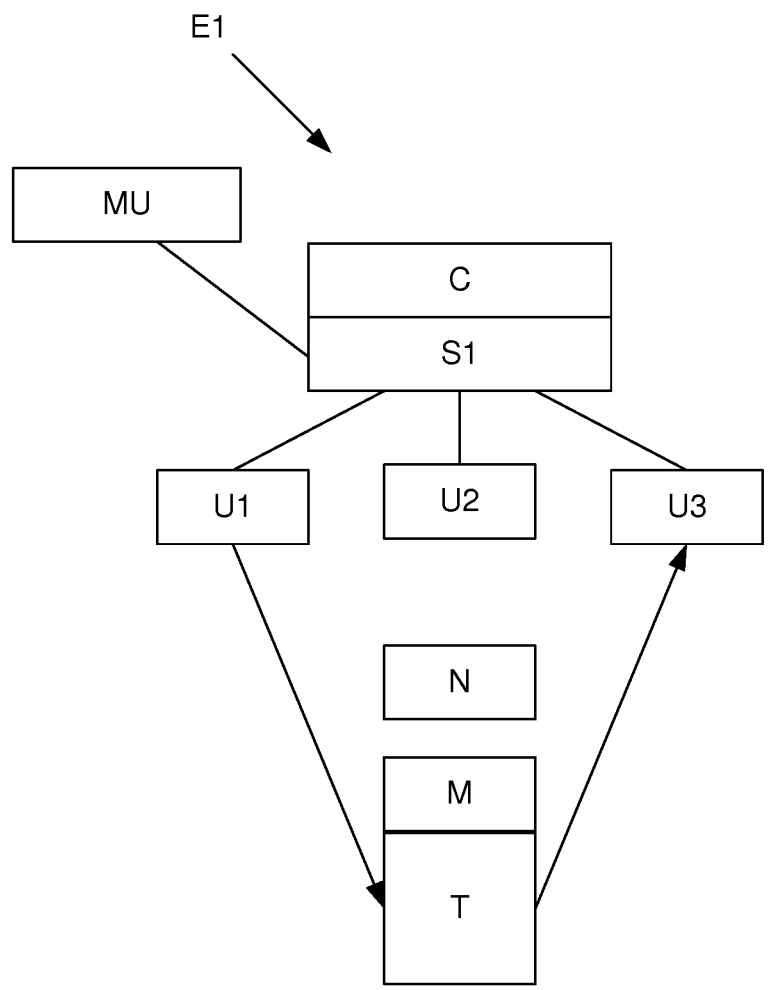

FIG. 4 schematically shows an example of communicating a data from a first user U1 to a third user U3, both being users of the first entity E1. As illustrated, the first user U1 on his own, i.e. without going through the first instance S1, sends encrypted data M in the form of a message comprising a text string T directly to the third user U3 of the first entity E1, and thus again without going through the first instance S1. The encrypted data is transmitted over a network N, which in this case typically is a LAN.

Figure 5:
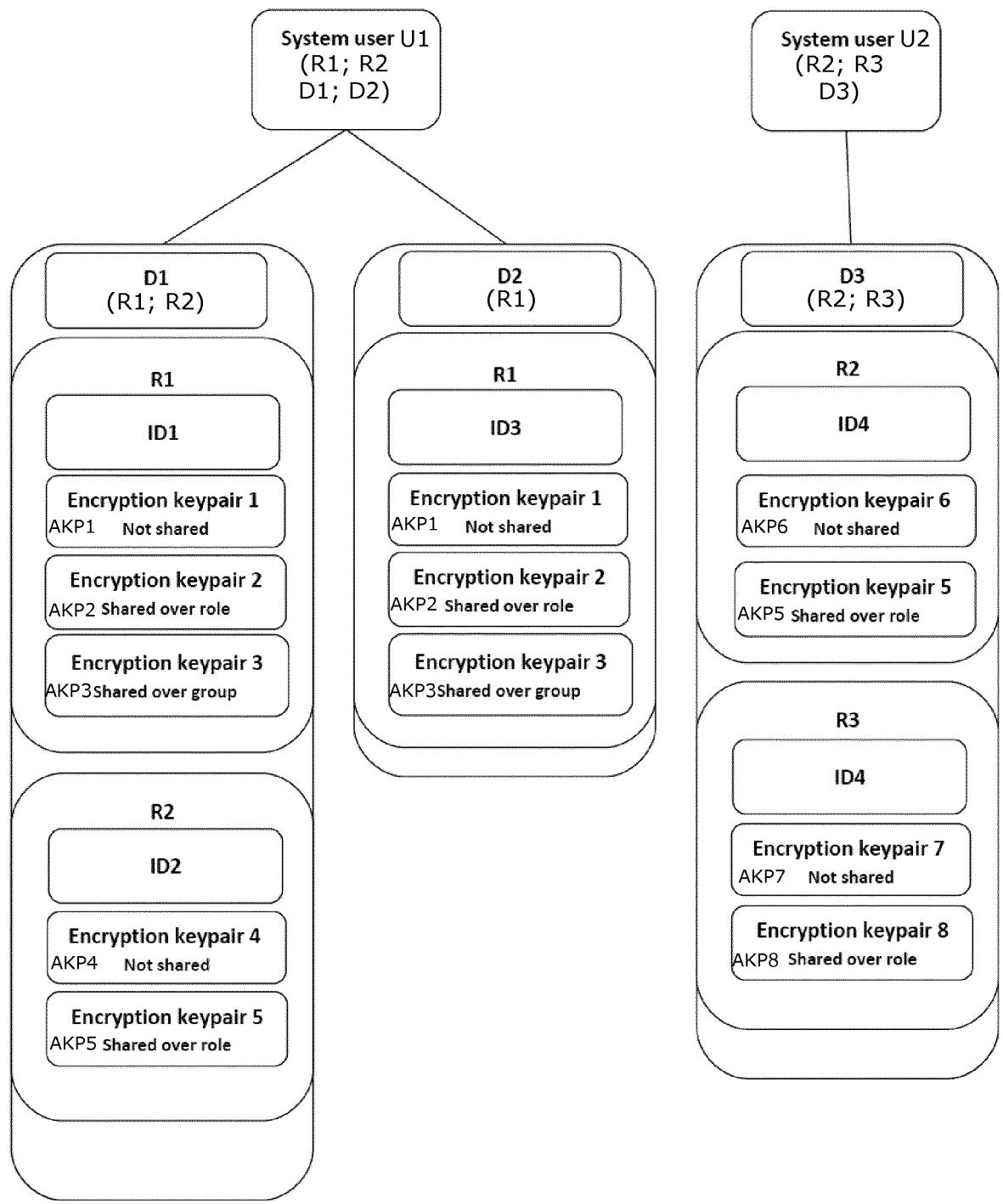
Figure 6:
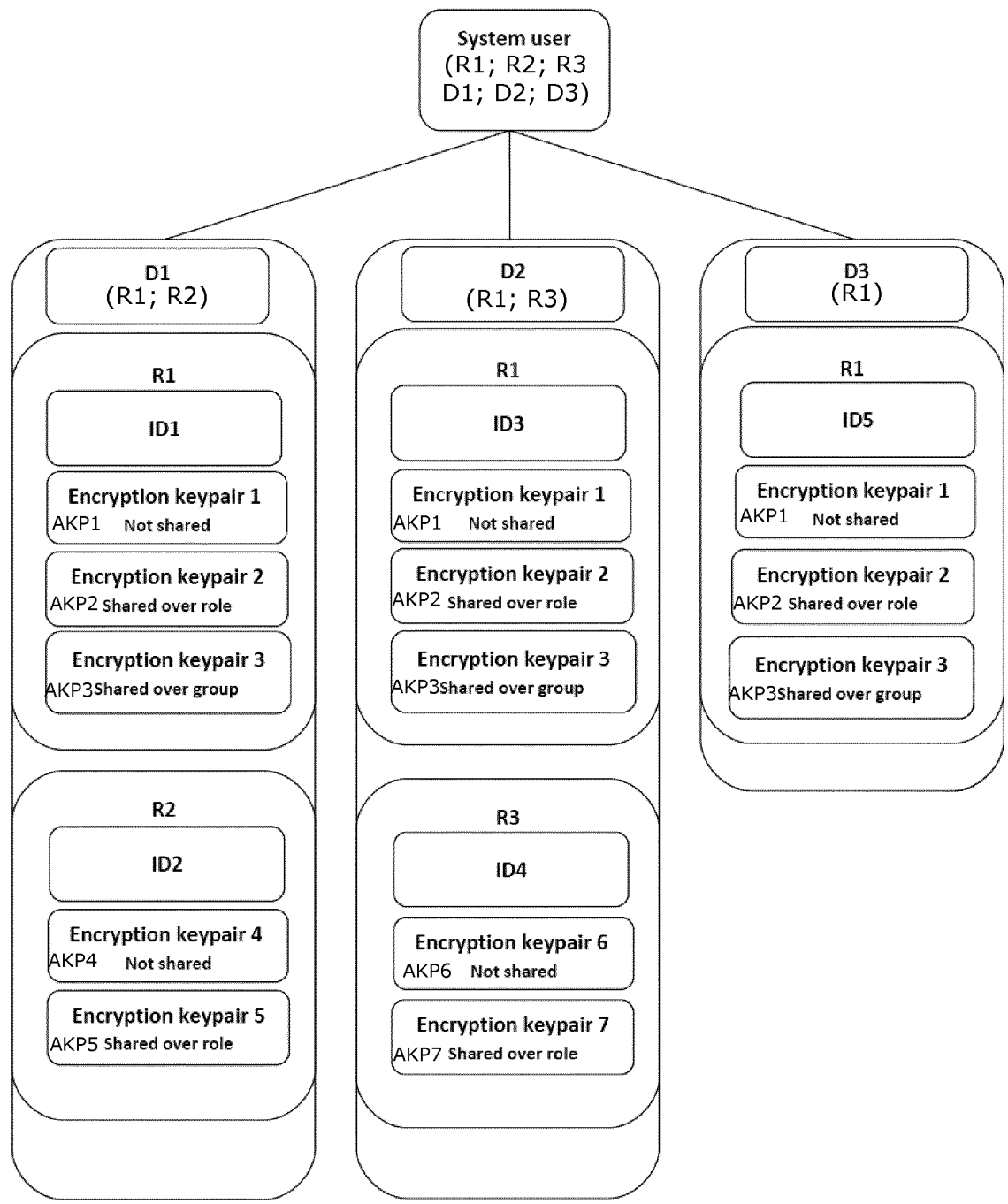

Turning now to FIGS. 5 and 6, the distribution of the key pairs over different users and devices, respectively, will be described.

FIG. 5 schematically illustrates how the encryption key pairs or asymmetric key pairs AKP are distributed over different users.

The two users U1 and U2 illustrated in FIG. 5 are sharing role R2. User U1 furthermore has role R1, while user U2 has role R3. Furthermore, user U1 has devices D1 and D2 while user U2 has electronic device D3.

As shown in FIG. 5, electronic device D1 is associated with roles R1 and R2, electronic device D2 is associated with role R1 and electronic device D3 is associated with roles R2 and R3.

Each role R1, R2, R3 may be associated with one or more of a not shared asymmetric key pair AKP1, AKP4, AKP6, AKP7, an asymmetric key pair AKP2, AKP5, AKP8 shared by the users with access to a specific role R and an asymmetric key pair AKP3 shared by the users and is associated with a specific group G.

For example the asymmetric key pair AKP5 is associated with role R2 and is the same for both users U1 and U2.

Furthermore, user U1 has three elements for electronic or digital identification and authentifications, ID1, ID2 and ID3, while user U2 has one element for electronic or digital identification and authentification ID4. An element for electronic or digital identification and authentification is unique for one or both of a role R and a device D. As shown, user U1 has two has element for electronic or digital identification and authentifications ID1 and ID2 on electronic device D1, where element for electronic or digital identification and authentification ID1 is unique for role R1 and element for electronic or digital identification and authentification ID2 is unique for role R2. As also shown, user U2 has one element for electronic or digital identification and authentification ID4 on electronic device D3. Element for electronic or digital identification and authentification ID4 is unique for electronic device D3, but is used for both role R2 and role R3, and thereby reduces the amount of pin codes necessary.

FIG. 6 schematically illustrates how the keys are distributed over different devices.

The user U3 illustrated in FIG. 6 has three roles R1, R2, R3 and three devices D1, D2 and D3.

As shown in FIG. 5, electronic device D1 is associated with roles R1 and R2, electronic device D2 is associated with roles R1 and R3 and electronic device D3 is associated with role R1. On electronic device D1 the user U3 is thus able to act in role R1 and role R2, for example by accessing and using one or more applications A associated with the role R1 or R2 in which user U3 currently acts. On electronic device D2 the user U3 will be able to act in role R1 and role R3. On electronic device D3 the user U3 will only be able to act in role R1.

Each role R1, R2, R3 may be associated with one or more of a not shared asymmetric key pair AKP1, AKP4, AKP6, an asymmetric key pair AKP2, AKP5, AKP7 shared over or associated with a specific role R and an asymmetric key pair AKP3 shared over or associated with a specific group G.

As illustrated in FIG. 5 the asymmetric key pairs AKP1 to AKP 7 are for a respective associated role R1 to R3 the same key pairs on the different devices D1 to D3. For example asymmetric key pairs AKP1 to AKP 3 are associated to role R1 on all three devices D1 to D3, whereby the necessary number of asymmetric key pairs may be reduced.

As is also illustrated in FIG. 5, the elements for electronic or digital identification and authentifications ID1 to ID5 are in this case unique for a given role and a given device. For example, element for electronic or digital identification and authentification ID1 is only used on electronic device D1 and only for role R1.

Encryption and Decryption Involving Two Different Entities

Encryption Method

In the following, the steps of an encryption method according to the invention will be described by way of an example and with reference to FIGS. 11 and 12.

Let us presume that a first user U1 of a first entity E1 in his second role R2 desires to send encrypted data M to a third user U3 of a second entity E2 in user U3's role R1.

Figure 11:
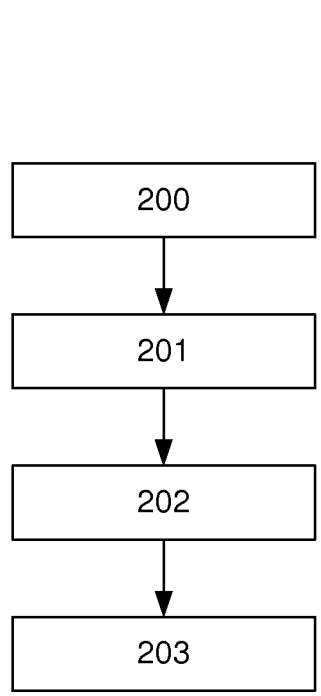
FIG. 11 shows a block diagram illustrating an encryption method according to a first embodiment of the invention.

Referring to FIG. 11, the first user U1 therefore first in step 200 provides data M.

The first user U1 then obtains a transmission ID STID that is unique for this transmission. A non-limiting example would be that instance one S1 provides it.

To encrypt the data M, the first user U1 then needs to obtain a symmetric encryption key SEK comprising one or more partial symmetric encryption keys PSEK as well as a public encryption key PK from the asymmetric key pair APK associated with the receiving user U3's role R1.

In step 201 user U1 obtains at least one public encryption key PK associated with the receiving user U3's role R1 from the second entity E2.

In step 202 user U1 obtains the one or more partial symmetric encryption keys PSEK. A non-limiting example of how to obtain a partial symmetric encryption key PSEK is to generate it, for example in the manner described further below, on an electronic device, preferably on an electronic device D1 associated with the first role R1.

User U1 then in step 203 encrypts the electronic data M using the combined symmetric encryption key SEK and then encrypts the partial symmetric keys with at least one public encryption key PK.

As the symmetric encryption key SEK used for encrypting the data M is in this way encrypted using at least one public encryption key PK associated with the receiving user U3's role R1, the first user U1 encrypting the data M in fact also encrypts the data M to himself. In other words, it also applies to the first user U1 that he may be replaced by another user in the same role R2 and/or that in case he loses his device D1, the device D1 may be disabled, without losing the possibility of accessing the encrypted data M. User U1 may now send the encrypted data M to user U3.

The encrypted, as described above, partial symmetric encryption keys PSEK is now transferred and stored in selected instances and as a minimum in the first instance S1.

The actual encryption of the data M performed in step 203 comprises the following steps, which are known per se.

The data M is encrypted using the one or more partial symmetric keys PSEK. The partial symmetric keys are subsequently combined, for example by means of a logica or bit operation, such as a XOR operation, to form the combined symmetric encryption key SEK.

The partial symmetric encryption keys PSEK are encrypted using the at least one public key PK associated with the role of the receiving user in which it is desired that he receives the encrypted data M. For example, this could be the third role R3 associated with the third user U3. Optionally, the at least one public key PK may also be associated with a specific group G and/or a specific user or electronic device D.

It may also be desirable to encrypt the partial symmetric keys PSEK using more than one public encryption key PK, for example in the event that it is desired to send the encrypted data M to several users U and/or different roles R.

In the event that more than one public encryption key PK is used, the partial symmetric encryption keys PSEK is encrypted using each public encryption key.

Figure 7:
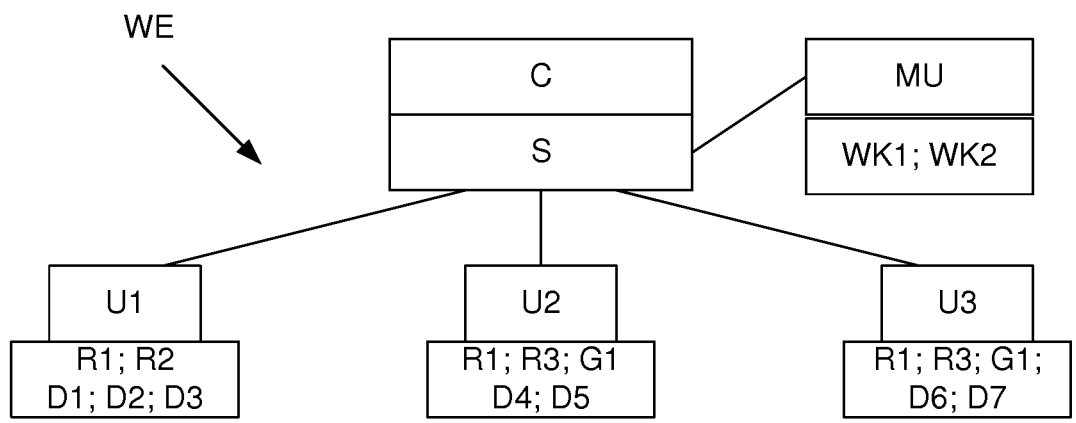
Figure 12:
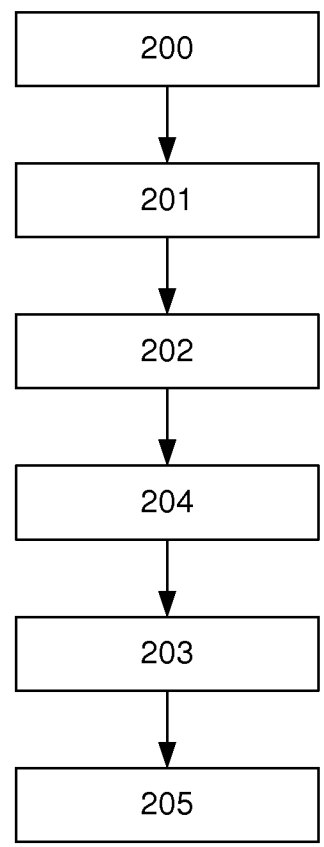
FIG. 12 shows a block diagram illustrating an encryption method according to a second embodiment of the invention.

Referring to FIG. 12, further optional steps may be added to the above method in case a witness entity WE is involved and the data M is to be encrypted using also a further partial symmetric encryption key WK. An example of a witness entity WE is shown in FIG. 7. This measure enhances the security of the method by forcing the receiving user, here user U3, to obtain two encryption keys from two separate entities.

In this case, user U1 in a step 204 performed before step 203 obtains a further partial symmetric encryption key WK. The further partial symmetric encryption key WK is obtained by generating it locally on an electronic device.

In step 203 the data M is then encrypted using the one or more partial symmetric keys PSEK as well as the further partial symmetric encryption key WK. The partial symmetric keys are subsequently combined, for example by means of a logica or bit operation, such as a XOR operation, to form the combined symmetric encryption key SEK.

Finally, user U1 in step 205 transmits the further partial symmetric encryption key WK to a witness entity WE (cf. FIG. 7) for safe storage.

The further partial symmetric encryption key WK may be stored in an instance S of the witness entity.

Decryption Method

In the following, the steps of a decryption method according to the invention will be described by way of an example and with reference to FIGS. 8 to 10.

Let us presume that a first user U1 of a first entity E1 in his second role R2 desires to send data M to a third user U3 of a second entity E2 in user U3's role R1 (cf. FIG. 3).

User U1 therefore encrypts the data M using a combined symmetric encryption key SEK and then encrypts one or more partial symmetric encryption keys PSEK using a public encryption key PK associated with the receiving user's U3 first role R1, generally by performing the encryption method described above.

Figure 8:
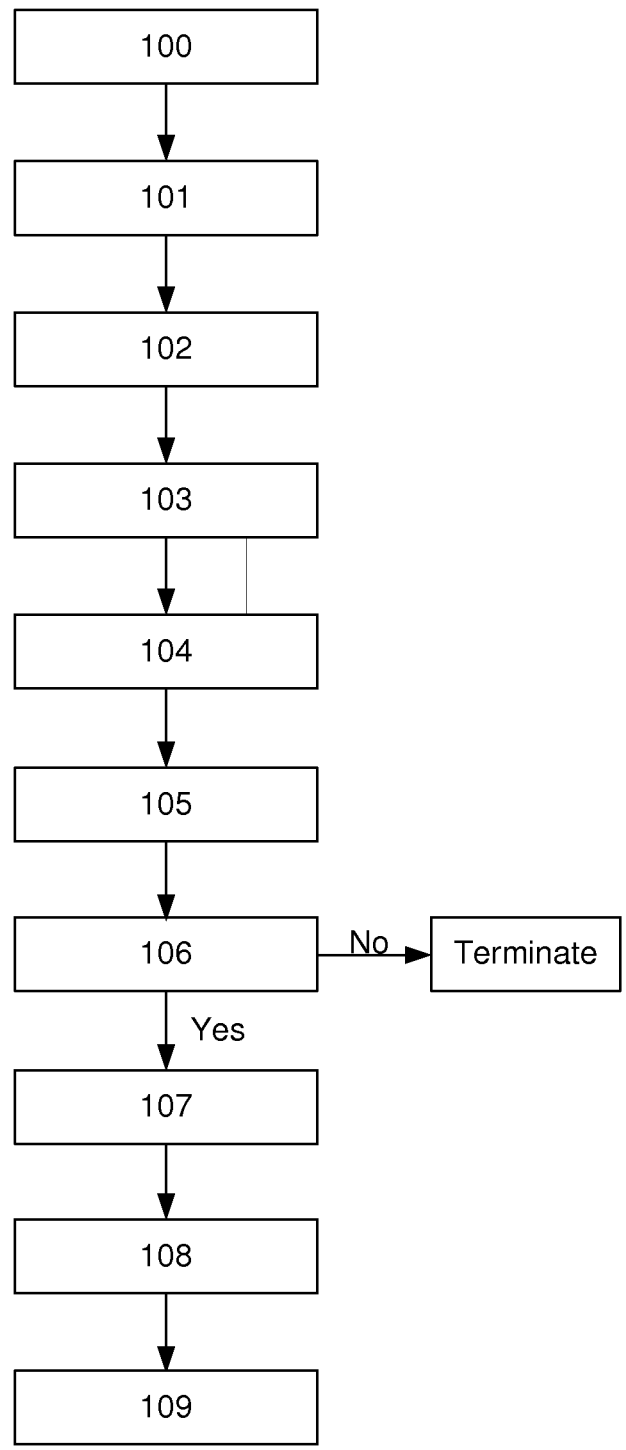
FIG. 8 shows a block diagram illustrating a decryption method according to a first embodiment of the invention.

Referring now to FIG. 8, in step 100 (cf. also FIG. 3), the encrypted data M transmitted by user U1 of entity E1 in his Role R1 over a network N to user U3 of entity E2 in his role R1 is received by the user U3.

In step 101, user U3 provides or obtains the asymmetric key pair AKP. This may be done in several different ways. Normally, user U3 already has access to the asymmetric key pair AKP, for example in virtue of having it stored on a device D of his.

In step 102, user U3 of entity E2 having received the encrypted data M in his role R1 asks entity E2 for permission to decrypt and open data M. That is, in essence user U3 requests entity E2 for the symmetric encryption key SEK, which he needs to decrypt the data M. When doing so user U3 also sends an element for electronic or digital identification and authentification ID1 being unique for the user in the role R1, as well as the transmission ID, TID, to entity E2 such as to identify himself and the relevant transmission.

If the transmission ID is a new transmission ID for the second instance S2 of the second entity E2 a request is sent to the first instance S1 of the first entity E1 for information about the transmission, non-limiting examples of such information being participating users and roles, timestamps and signatures.

In step 103, entity E2 sends an identification token, IDT, to user U3 in reaction to the request from user U3 in step 102. Step 103 is, however, only carried out the first time data M received with a given transmission is decrypted.

User U3 then, in step 104, sends the identification token, IDT, to entity E1 together with information such as a role ID, RID, identifying role R1 of user U3 asking entity E1 for the partial symmetric encryption key PSEK associated with the first role R1 of user U3.

In step 105, entity E1 performs a check or authentication of the identity of user U3, using the identification token IDT, by asking entity E2 if user U3 really is who he claims to be.

In step 106, entity E2 responds to the authentication requested by entity E1 by confirming or disconfirming the identity of user U3. If comfirming, entity E2 does so by sending the name and other relevant data regarding user U3 and the role R1 to entity E2.

Steps 105 and 106 are included to ensure that a user unwarranted claiming to be user U3 cannot gain access to the data M. Thus, if the result of step 106 is a disconfirmation, the method is terminated and a termination data May or may not be sent to the user unwarranted claiming to be user U3. Also, the user unwarranted claiming to be user U3 may be blocked from access to entity E2 and/or entity E1 altogether.

Presuming the result of step 106 is a confirmation, the method continues with step 107.

In step 107, entity E1 in reaction to the confirmation received in step 106 transmits the partial symmetric encryption key PSEK associated with the first role R1 of user U3 to entity E2.

In step 108, entity E2 then transmits the partial symmetric encryption key PSEK associated with the first role R1 of user U3 and with the given transmission ID to user U3.

Figure 9:
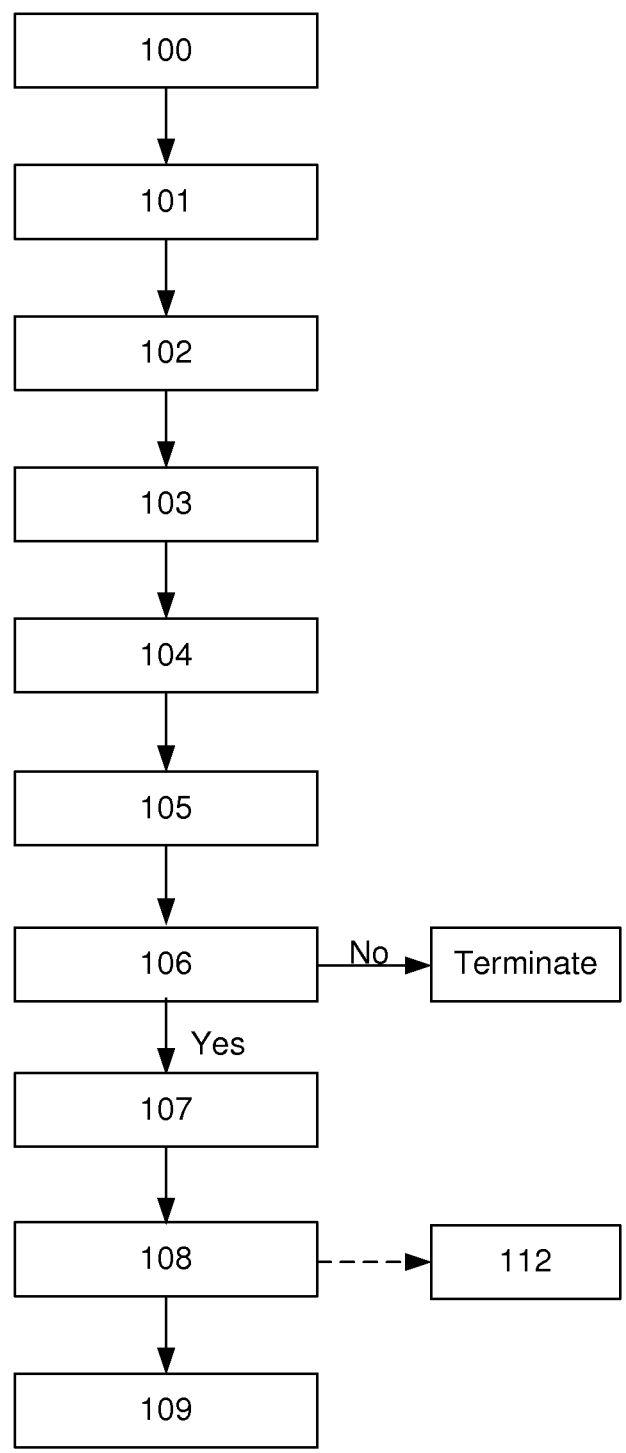
FIG. 9 shows a block diagram illustrating a decryption method according to a second embodiment of the invention.
Figure 10:
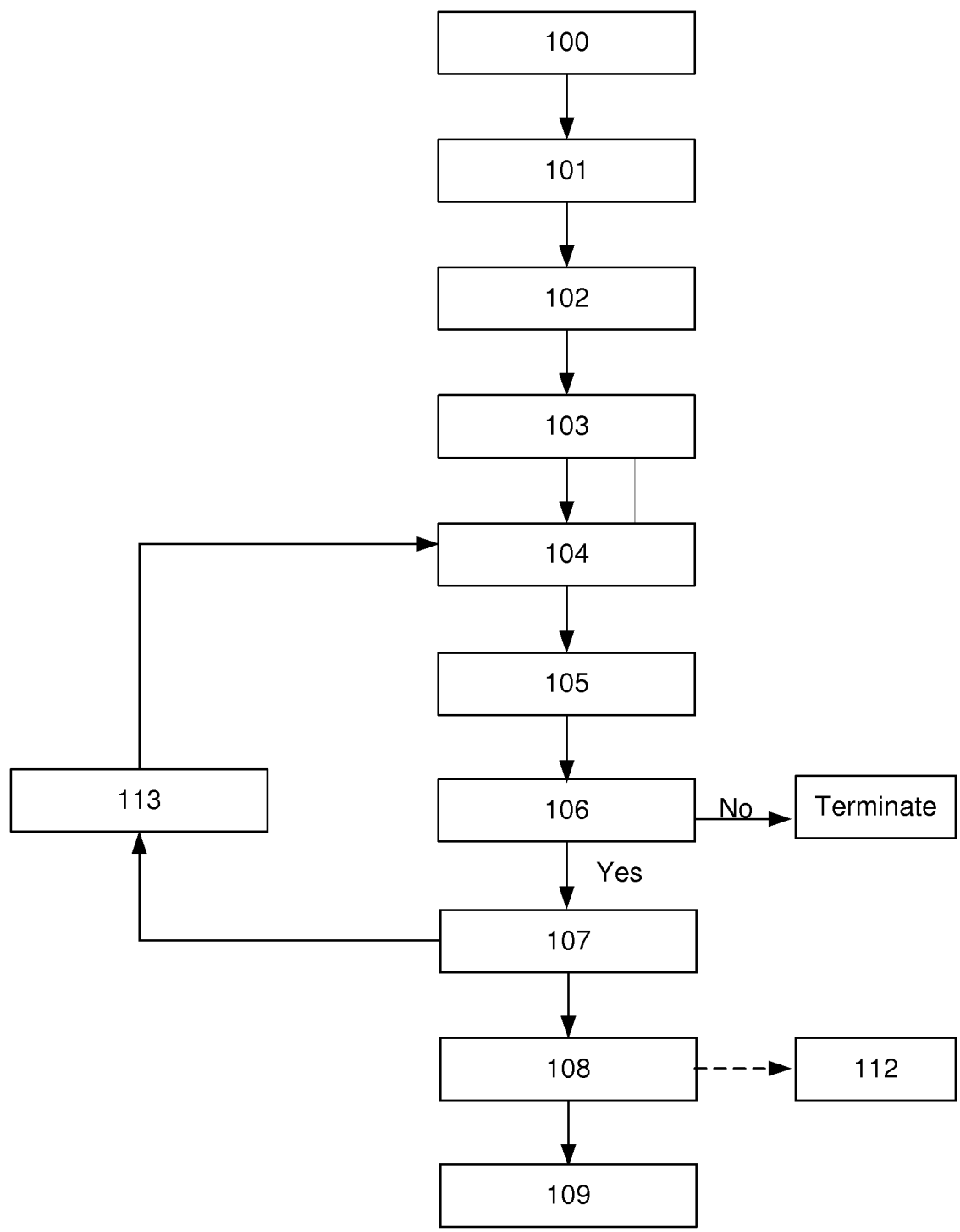
FIG. 10 shows a block diagram illustrating a decryption method according to a third embodiment of the invention and involving the witness entity of FIG. 7.

Entity E2 will then, in a step 112 illustrated on FIGS. 9 and 10, store the partial symmetric encryption keys PSEK associated with the first role R1 of user U3 in instance two S2 for future use. Thereby, entity E2 may access the partial symmetric encryption key PSEK associated with the first role R1 of user U3 and with the given transmission ID even in the event that entity E1 is not accessible.

Thus, the second time the third user U3 desires to access data M received in step 100 with the given transmission ID, the third user U3 may obtain all symmetric encryption keys needed from the second instance S2 of the second entity E2.

In step 109, user U3 may then decrypt and read data M.

The actual decryption of the encrypted data M performed in step 109 comprises the following steps, which are known per se.

First, the one or more partial symmetric encryption keys PSEK, which is encrypted as described above, is decrypted using the asymmetric key pair AKP associated with role R1 of user U3.

Then, the partial symmetric encryption keys PSEK is combined, for example by means of a logica or bit operation, such as an inverse XOR operation, to retrieve the combined symmetric encryption key SEK.

Finally, the data M is decrypted using the retrieved combined symmetric encryption key SEK.

Referring to FIG. 10, a further optional step may be added to the above method. In case a witness entity WE (cf. also FIG. 7 for an example of a witness entity WE) is involved and a further partial symmetric encryption key is needed to decrypt data M, at least the method steps 104 to 108 are in optional further step 113 repeated as described above, but now for the witness entity WE in the place of entity E1. Thereby user U3 may obtain a further partial symmetric encryption key WK needed to decrypt the data M. The further partial symmetric encryption key WK may be obtained from the witness entity WE (cf. FIG. 7).

Encryption and Decryption within One and the Same Entity

In any event, the above described encryption method and decryption method according to the invention may also be performed entirely within one and the same entity. That is, using the above example, both the first user U1 desiring in his role R1 to send encrypted data M to a third user U3, and the said third user U3 may be users of the same entity, say for example the first entity E1.

Encryption

Let us presume that a first user U1 of a first entity E1 in his first role R1 desires to send an encrypted data M to a third user U3 of a the same first entity E1 in user U3's role R1.

Still referring to FIG. 11, user U1 therefore first in step 200 provides data M and obtains a transmission ID, STID.

To encrypt the data M, the first user U1 then needs to obtain at least one partial symmetric encryption key PSEK.

In step 201 user U1 in this case obtains at least one public encryption key of at least one asymmetric key pair AKP associated with the receiving user U3's role R1 from the first entity E1, particularly from the instance S1 of the first entity E1.

In step 202 user U1 combines the partial symmetric encryption keys PSEK to the combined symmetric encryption key SEK.

User U1 then in step 203 encrypts the electronic data M using the combined symmetric encryption key SEK and then encrypts the partial symmetric keys PSEK with at least one public encryption key PK of an asymmetric key pair AKP associated with the first role R1 of the third user U3.

User U1 will now transfer the at least one partial symmetric encryption keys PSEK to at least instance one S1 owned by the first entity E1.

User U1 may now send the encrypted data M to user U3.

Remaining and/or additional steps, including those related to the involvement of a witness entity WE, are the same as in the case of two different entities.

Decryption Method

Let us presume that a first user U1 of a first entity E1 in his role R1 desires to send data M to a third user U3 of the first entity E1 in user U3's role R1 (cf. FIG. 4).

User U1 therefore encrypts data M using a symmetric encryption key SEK and distributes the partial symmetric encryption keys PSEK combined to form the symmetric encryption key SEK generally by performing the encryption method described above.

Referring now to FIG. 8, in step 100 (cf. also FIG. 3), the encrypted data M transmitted by user U1 of entity E1 in his Role R1 over a network N to user U3 of entity E1 in his role R1 is received by the user U3.

In step 101, user U3 provides the public encryption key PK.

In step 102, user U3 having received the encrypted data M in his role R1 asks the first instance S1 of the first entity E1 for permission to decrypt and open data M. That is, in essence user U3 requests entity E1 for the symmetric encryption key SEK, which he needs to decrypt the data M. When doing so user U3 also sends an element for electronic or digital identification and authentification ID1 associated with the user in the role R1 as well as the transmission ID, TID, to entity E1 such as to identify himself and the relevant transmission.

In this case the instance S1 of the first entity E1 already knows the transmission in question as well as the roles and users associated with the first entity E1. Referring to the method step numbers used above, as entity E1 knows user U3 the method therefore in this case skips directly to step 107, in which entity E1 transmits the partial symmetric encryption key PSEK associated with the first role R1 of user U1 to user U3. Steps 107 and 108 as described above are thus performed as one common step.

Optionally, entity E1 may, in a step 112 illustrated on FIGS. 9 and 10, store the symmetric encryption key SEK associated with the first role R1 of user U1 in the first instance S1 or in a suitable memory unit MU for future use. Thereby, entity E1 may access the symmetric encryption key SEK associated with the first role R1 of user U1 even in the event that the specific user U1 in his role R1 to which the symmetric encryption key SEK is associated is no longer related to the role R1 or even entity E1 altogether. This may e.g. be the case if user R1 has changed jobs and/or workplace.

In step 109, user U3 may then decrypt and read data M.

Remaining and/or additional steps, including those related to the involvement of a witness entity WE, are analogous to those carried out in the case of two different entities.

The person skilled in the art realizes that the present invention by no means is limited to the preferred embodiments described above. On the contrary, many modifications and variations are possible within the scope of the appended claims.

One further possibility is to provide the one or more partial encryption keys held by the entity of the encrypting and sending user with a limitation or restraint such as a time stamp preventing the release of the partial symmetric encryption key prior to a specific date and/or time.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

LIST OF REFERENCE NUMERALS

A Application
AKP Asymmetric key pair
C Input unit
D Device
E Entity
G Group
ID Element for electronic or digital identification and authentification
IDT ID token
M Data or document
MU Memory unit
N Network
PK Shared or public encryption key
R Role
RID Role ID
S Instance
SEK Symmetric encryption key (private)
TID Transmission ID
T Text or content of data
U User
WE Witness entity
WK Witness encryption key

The invention claimed is:

1. A method for decrypting data sent by a first user having at least a first role in a first entity, the first entity comprising at least the first user and a first instance, to a second user having at least a second role in a second entity, the second entity comprising at least the second user and a second instance, the data being encrypted using a symmetric encryption key comprising one or more partial symmetric encryption keys, the one or more partial symmetric encryption keys of the symmetric encryption key being encrypted using a public key of an asymmetric key pair comprising a private key and a public key, wherein the asymmetric key pair is associated with the second role of the second user, and the encrypted data is associated with a transmission ID, the method comprising the following steps:

a) the second user receives the encrypted data in his second role, b) the second user provides an element of identification and authentication identifying the second user in its second role and being unique to the user in its second role and the asymmetric key pair associated with this role or user, c) the second user sends a first request to the second instance requesting access to the encrypted transmission, the first request comprising the transmission ID and the element for electronic or digital identification and authentication identifying the second user in its second role and being unique to the user in its second role, and if the transmission ID is a new transmission ID for the second instance, an information request is sent by the second instance to the first instance for information about the transmission, d) in response to the first request the second instance sends an identification token to the second user, the identification token will be used for identifying and authenticating the user and its role in the second entity, e) the second user sends a second request to the first instance for access to the partial symmetric key held by the first instance, the second request comprising the identification token, information identifying the second role of the second user and the transmission ID, f) the first instance in reaction to the second request sends a third request to the second instance to obtain authentication and verification of the identity of the second user, the third request comprising the identification token and the information identifying the second role of the second user, g) if the second instance recognizes the identification token and the information identifying the second role of the second user, the second instance responds to the third request by transmitting the name and other relevant data regarding the second user to the first instance, h) the first instance in reaction to the authentication of the role and name and other relevant data regarding the second user received in step g) transmits the held partial symmetric encryption key to the second user, after which the second user can decrypt and where appropriate combine the partial symmetric encryption keys to create the symmetric key that is then used to decrypt the encrypted data.

2. The method according to claim 1, wherein the symmetric encryption key used for encrypting the data further comprises at least one further partial symmetric encryption key, the at least one further partial symmetric encryption key being stored in at least one witness entity, the at least one witness entity comprising a third instance, and the method further comprises performing the following steps after step a):

i) the second user sends a sixth request to the third instance for the at least one further partial symmetric encryption key, the sixth request comprising the identification token, information identifying the second role of the second user and the transmission ID, j) the third instance in reaction to the sixth request sends a seventh request to the second instance to obtain verification of the identity of the second user, the seventh request comprising the identification token and the information identifying the second role of the second user, k) if the second instance recognizes the identification token and the information identifying the second role of the second user, the second instance responds to the seventh request by transmitting the name and other relevant data regarding the second user to the third instance, l) the third instance in reaction to the name and other relevant data regarding the second user received in step m) transmits the at least one further partial symmetric encryption key to the second user, after which the second user may decrypt the further partial symmetric encryption key and the one or more partial symmetric encryption keys using the asymmetric key pair associated with the role, combine the further partial symmetric encryption key and the one or more partial symmetric encryption keys to a combined symmetrical encryption key and then decrypt the encrypted data using the combined symmetric encryption key.

3. The method according to claim 1, wherein step h) comprises the following steps:

the first instance in reaction to the confirmation received in step g) transmits the at least one partial symmetric encryption key to the second instance, and the second instance transmits the at least one partial symmetric encryption key to the second user, or wherein step h) comprises the step that the partial symmetric keys are transmitted to the second instance to be stored.

4. The method according to claim 1, and further comprising the step of the second instance storing the at least one partial symmetric encryption key.

5. The method according to claim 1, and further comprising the step that when the second user requests access to open the data received in step a) for the second time, the first instance replies with all partial symmetric encryption keys.

6. The method according to claim 1, wherein at least one partial symmetric encryption key is received by the second user with the encrypted data.

7. The method according to claim 1, and further comprising logging in at least one of the first instance, the second instance and the third instance data indicative of user activity related to any one or more of the first instance, the second instance and the third instance, particularly data indicative of user activity related to attempts to obtain a partial symmetric encryption key from at least one of the first instance, the second instance and the third instance.

8. The method according to claim 1, wherein the first user furthermore has at least a first electronic device associated with the user in the first role, wherein the first instance further comprises an input device, and wherein, in case the first electronic device is missing, the method further comprises the step of the user disabling the first electronic device by means of said input device.

9. The method according to claim 1, wherein the second user has at least a second electronic device associated with the second role, and wherein at least one of the asymmetric key pair and the element for electronic or digital identification and authentication is associated to the second electronic device and/or wherein the second instance further comprises an input device, and wherein, in case the second electronic device is missing, the method further comprises the step of the user disabling the second electronic device by means of said input device.

10. The method according to claim 1, wherein the at least one symmetric encryption key comprises several partial symmetric keys provided separately and joined to form the symmetric encryption key.

* * * * *